(12) United States Patent
Velamakanni et al.

(10) Patent No.: US 9,815,962 B2
(45) Date of Patent: Nov. 14, 2017

(54) TIRE WITH CARBON BLACK REINFORCED POLYURETHANE

(71) Applicant: The Goodyear Tire & Rubber Company, Akron, OH (US)

(72) Inventors: Aruna Mani Velamakanni, Copley, OH (US); Frank James Feher, Copley, OH (US); Anthony Ryan Lame, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 229 days.

(21) Appl. No.: 14/703,223

(22) Filed: May 4, 2015

(65) Prior Publication Data

US 2016/0060435 A1 Mar. 3, 2016

Related U.S. Application Data

(63) Continuation-in-part of application No. 14/468,371, filed on Aug. 26, 2014.

(51) Int. Cl.
| | |
|---|---|
| *C08K 3/34* | (2006.01) |
| *C08K 5/12* | (2006.01) |
| *C08K 9/10* | (2006.01) |
| *C08G 18/76* | (2006.01) |
| *C08G 18/42* | (2006.01) |
| *B60C 1/00* | (2006.01) |

(52) U.S. Cl.
CPC .............. *C08K 3/34* (2013.01); *B60C 1/00* (2013.01); *C08G 18/42* (2013.01); *C08G 18/7671* (2013.01); *C08K 5/12* (2013.01); *C08K 9/10* (2013.01); *C08G 2380/00* (2013.01)

(58) Field of Classification Search
CPC ..... C08G 2380/00; C08G 18/72; C08G 18/00
See application file for complete search history.

(56) References Cited

U.S. PATENT DOCUMENTS

| | | | |
|---|---|---|---|
| 3,294,733 A | 12/1966 | Medalia et al. | |
| 3,298,984 A | 1/1967 | Rye | |
| 3,317,458 A | 5/1967 | Boun et al. | |
| 3,345,324 A | 10/1967 | Bristol et al. | |
| 3,491,052 A | 1/1970 | Hare et al. | |
| 3,652,468 A * | 3/1972 | Schwarb et al. ... | C08G 18/6204 521/136 |
| 3,767,605 A | 10/1973 | Gerlicher | |
| 3,923,707 A | 12/1975 | Berg et al. ................. | 260/17 R |
| 4,095,637 A | 6/1978 | Krishnan ...................... | 152/323 |
| 4,131,667 A | 12/1978 | Lovell et al. ................. | 264/571 |
| 4,158,378 A * | 6/1979 | Pearson .................. | B60C 13/04 152/370 |
| 4,295,513 A | 10/1981 | Lovell et al. ................ | 152/358 |
| 5,254,405 A * | 10/1993 | Panaroni .................. | C08L 75/04 36/25 R |
| 5,385,953 A * | 1/1995 | McClellan ......... | C08G 18/0885 152/452 |
| 6,800,126 B2 | 10/2004 | Magnus et al. ............... | 106/477 |
| 7,247,669 B2 | 7/2007 | Sandstrom .................... | 524/492 |
| 8,662,122 B2 | 3/2014 | Benzing, II ..................... | 152/13 |
| 2002/0111413 A1* | 8/2002 | Lopez-Serrano Ramos .................... | C08K 3/04 524/495 |

* cited by examiner

*Primary Examiner* — Bijan Ahvazi
*Assistant Examiner* — Thuy-Ai N Nguyen
(74) *Attorney, Agent, or Firm* — Henry C. Young, Jr.

(57) ABSTRACT

This invention relates to a vehicular tire containing at least one carbon black reinforced polyurethane component.

18 Claims, No Drawings

TIRE WITH CARBON BLACK REINFORCED POLYURETHANE

FIELD OF THE INVENTION

This invention relates to a vehicular tire containing at least one carbon black reinforced polyurethane component.

BACKGROUND OF THE INVENTION

Various vehicular tires have been proposed which are composed of, or contain a component composed of, polyurethane. The polyurethane is typically the reaction product of an organic polyisocyanate and polymeric polyol which contains a slight molar excess of the polyisocyanate in the reaction mixture to allow for the presence of very small amounts of impurities, including moisture, which might be present with which the polyisocyanate is reactive.

In one embodiment, the polyurethane for this invention is desirably a cast polyurethane in a sense of being the product of casting a liquid polyurethane reaction mixture into a suitable mold cavity to form the molded polyurethane product without being sulfur or peroxide cured. Such cast polyurethane desirably does not contain an unsaturated hydrocarbon component.

A cast polyurethane is intended to be distinguished from a millable polyurethane composed of a product of a polyurethane reaction mixture containing unsaturated hydrocarbon component(s) cured polyurethane which is thereby sulfur curable to yield a sulfur or peroxide cured polyurethane.

Exemplary of such tires composed of or containing polyurethanes are, for example, and not intended to be limitive, U.S. Pat. No. 4,095,637 relating to a solid polyurethane tire/wheel assembly and U.S. Pat. Nos. 4,295,513, 4,131,667 and 8,662,122 in general.

In practice, tires are generally subject to dynamic flexing during their service and operation. For tires which are composed of or which contain a component comprised of, polyurethane, it is generally considered as being important to provide a degree of resistance to cut growth propagation for the polyurethane.

For this invention, it is proposed to use rubber reinforcing carbon black for providing reinforcement for the polyurethane in a sense of providing a degree of cut growth propagation resistance for the polyurethane.

For rubber tires, particulate reinforcement in a form of rubber reinforcing carbon black has often been used for various rubber compositions for rubber tire components. However, rubber reinforcing carbon black for reinforcement of rubber compositions is dusty in nature and is therefore conventionally commercially provided as compacted carbon black in a form of pellets thereof for addition to rubber compositions instead of dusty un-compacted carbon black. During high shear mixing of the compacted carbon black pellets in the highly viscous rubber composition, the carbon black pellets are broken down to their very small carbon black aggregates to provide carbon black reinforcement of the rubber composition. For example, see U.S. Pat. Nos. 6,800,126, 7,247,669, 3,294,733, 3,298,984, 3,317,458, 3,345,324, 3,491,052, 3,767,605 and 3,923,707.

However, mixing of a liquid polyurethane reaction mixture is conducted under low shear mixing conditions which is considered as being insufficient to break down the carbon black pellets to small carbon black particles, or aggregates.

Therefore, for the practice of this invention, pellets of compacted carbon black are pulverized into small carbon black granules which are then mixed with the polymeric polyol component of a polyurethane reaction mixture. It is proposed to use the pulverized rubber reinforcing carbon black as being a chemically interactive particulate reinforcement for a polyurethane component of a vehicular tire. It is considered that such pulverized rubber reinforcing carbon black presents a particular advantage for providing reinforcement of polyurethane for a tire or tire component. Such advantage relates to the pulverized rubber reinforcing carbon black surface as containing numerous isocyanate reactive groups which can combine chemically with the aforesaid excess isocyanate groups contained in a polyurethane reaction mixture to create covalent linkages between the carbon black and isocyanate of the polyurethane reaction mixture, perhaps also in a sense of crosslinking, which can thereby provide reinforcement for improvement of various physical properties of the polyurethane. Representative of various isocyanate reactive groups which can reside on the surface of the pulverized carbon black are, for example and not intended to be limiting, hydroxyl groups, carboxylic acid groups, and quinones.

Affinity of the carbon black with the polyurethane can depend upon accessibility and reactivity of such isocyanate reactive groups on the carbon black to the isocyanate groups of the polyurethane.

By providing the rubber reinforcing carbon black as a product of disintegration of compacted rubber reinforcing carbon black pellets, namely pulverized carbon black pellets, it is envisioned that isocyanate reactive surfaces of the rubber reinforcing carbon black can become created and exposed to better present and make available the aforesaid isocyanate reactive groups on the surface of the carbon black particles.

However, it is recognized that the rubber reinforcing carbon black of compacted carbon black particles normally inherently contains moisture adsorbed on its surface. The moisture is inherently reactive with the aforesaid excess isocyanate groups contained in an isocyanate/polymeric polyol based polyurethane reaction mixture and thereby significantly interferes with, and perhaps negates, the aforesaid interaction of isocyanate reactive groups of the carbon black surface with isocyanate groups contained in the polyurethane reaction mixture and thereby prospective improvements in polyurethane physical properties.

For example, to reduce or eliminate moisture from the carbon black granules, the rubber reinforcing carbon black pellets may be heated, for example, to at least about 104° C. for a suitable period of time hours followed by cooling to room temperature under a dry nitrogen atmosphere.

A desiccant such as dry molecular sieves may be blended with one or more of the pulverized rubber reinforcing carbon black granules (e.g. heat treated pulverized carbon black granules with reduced moisture content) and polymeric polyol to further remove moisture or prevent moisture interference from the rubber reinforcing carbon black granules as well as the polymeric polyol.

Therefore, in one embodiment of the invention, a desiccant in a form of dried molecular sieves is mixed with the dried disintegrated rubber reinforcing carbon black particles prior to introduction into the polyurethane reaction mixture (e.g. by pre-blending with the polymeric polyol of the polyurethane reaction mixture) to promote moisture free disintegrated rubber reinforcing carbon black particles.

The molecular sieve-containing product of the pulverized rubber reinforcing carbon black and polyol may then be mixed with the polyisocyanate to create the polyurethane reaction mixture and, ultimately, the polyurethane product of the reaction mixture which will contain the molecular sieves.

Rubber reinforcing carbon blacks are referenced, for example, in *The Vanderbilt Rubber Handbook*, 13$^{th}$ edition, (1991), Pages 397 through 419, and presented on Pages 417 and 418 with associated ASTM designated N numbers together with their Iodine adsorption and DBP (dibutylphthalate) number characterizations. The particle size and structure of the carbon black play a significant role, perhaps even a major role, in its dispersability in a polymer matrix and associated reinforcing properties. For example, smaller sized particles having greater surface areas (e.g. greater iodine adsorption values, g/kg, ASTM D1510) with large structure (e.g. significant dibutyl phthalate adsorption values, cc/100 g, ASTM D2414) tend to be very reinforcing but sometimes difficult to disperse in a polymer matrix. Larger sized particles, with thereby less relative surface area, with similar structure tend to be more easily dispersible in a polymer matrix but less reinforcing.

SUMMARY AND PRACTICE OF THE INVENTION

A toroidal (shaped) tire is provided comprised of or containing at least one component comprised of a carbon black reinforced polyurethane (dynamically carbon black reinforced polyurethane) containing a dispersion of molecular sieve desiccant and from about 1 to about 5, alternately from about 2 to about 4 weight percent of granular aggregates (granules) of pulverized pellets of compacted rubber reinforcing carbon black having an average aggregate particle size in a range of from about 1 to about 15, alternately from about 8 to about 15 or desirably from about 5 to about 10, microns, (depending upon the extent or degree of pellet pulverization), wherein the polyurethane is the product of a reaction mixture of at least one polymeric polyol and organic polyisocyanate having a ratio of isocyanate groups to hydroxyl groups of said polymeric polyol(s) in a range of from about 1.1/1 to about 2/1, wherein said polymeric polyol is comprised of at least one of polyester polyol and polyether polyol, desirably a polyester polyol, wherein the carbon black reinforcement of said polyurethane is the product of said polyisocyanate and isocyanate reactive groups on said pulverized rubber reinforcing carbon black granules were said isocyanate reactive groups are comprised of at least one of hydroxyl groups, carboxylic acid groups, and quinone groups.

In one embodiment, the polymeric polyol is a saturated hydrocarbon polymeric polyol which therefore does not contain carbon-to-carbon double bonds.

In one embodiment, a method of preparing a tire, or tire component, comprised of a carbon black reinforced polyurethane which comprises:

(A) Preparing a carbon back reinforced polyurethane reaction mixture comprised of:
 (1) forming a composite of granules of pulverized compacted pellets of rubber reinforcing carbon black and polymeric polyol comprised of at least one of polyester polyol and polyether polyol, desirably polyester polyol, for which at least one of said carbon black granules, polymeric polyol and mixture of carbon black granules and polymeric polyol, contains a molecular sieve desiccant, where said pulverized carbon black granules have an average aggregate particle size in a range of from about 1 to about 20 microns (alternately from about 8 to about 15 or desirably from about 8 to about 12 microns) and where the surface of the pulverized carbon black granules contain at least one isocyanate reactive group comprised of at least one of hydroxyl groups, carboxylic acid groups, and quinone groups,
 (2) optionally providing a plasticizer with said composite such as, for example a aliphatic adipate containing from 8 to about 20 carbon atoms, such as for example, dioctyl adipate, (B) Blending said composite with an organic polyisocyanate to form a polyurethane reaction mixture having a molar excess of isocyanate groups of said polyisocyanate as a ratio of isocyanate groups to hydroxyl groups of said polymeric polyol in a range of from 1.1/1 to about 2/1, (C) Casting said polyurethane reaction mixture into a tire or tire component mold cavity (e.g. toroidal tire mold cavity), and (D) Allowing said polyisocyanate to react with both of said polymeric polyol and said isocyanate reactive groups on said carbon black granules to thereby form a carbon black reinforced polyurethane tire or tire component.

In one embodiment, the polymeric polyol is a saturated hydrocarbon polyol which therefore does not contain carbon-to-carbon double bonds.

In one embodiment, said carbon black of the carbon black aggregates may desirably have an Iodine adsorption value (ASTM D1510) in a range of from about 100 to about 145 g/kg together with a dibutylphthalate (DBP) value (ASTM D2414) in a range of from about 40 to about 125 cc/100 g.

In one embodiment, the polymeric polyol has an hydroxyl functionality of from about 2 to about 3.

In one embodiment, the polymeric polyester polyol may be a product of dicarboxylic acid having from about 4 to about 10 carbon atoms and hydroxyl terminated hydrocarbon diol having from 2 to 8 carbon atoms which may be, for example, a condensation product of glycols and organic polycarboxylic acid or anhydride.

Representative low molecular weight polyols for the preparation of the polyester polyols are, for example, glycols such as ethylene glycol, propylene glycol, butylene glycol, pentylene glycol, decamethylene glycol, etc. Representative examples of the organic dicarboxylic acids may be, for example, succinic acid, glutaric acid, adipic acid, phthalic acid, terephthalic acid, isophthalic acid, suberic acid, sebacic acid, pimelic acid, and azelaic acid. The anhydrides of such acids might be used in place of the acid if desired and appropriate. If desired, from about one to 20 percent by weight of a triol or higher polyfunctional polyol or polyfunctional acid can be present to promote branching in the polyurethane polymer itself if desired and appropriate.

In one embodiment, the polymeric polyether polyol may be a product of at least one of alkylene oxides and alkylene glycols. Such polyether polyols might be prepared, for example, by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or optionally with a polycarboxylic acid such as phthalic acid. The polyether polyols include polyalkylene-aryl ether glycols or triols, polytetramethylene ether glycols, polyalkylene ether-thioether glycols or triols and alkyd resins. Generally the polytetramethylene ether glycols are preferred polyether glycols.

The polyurethane reaction mixtures are generally applied as liquid mixtures so that, where appropriate, the polymeric polyol may be pre-heated to create a liquid mixture.

In one embodiment, the polymeric polyols may have a molecular weight, for example, of from about 1,200 to about 1,400 Daltons.

In one embodiment, the organic polyisocyanates include various organic diisocyanates and mixtures thereof. The organic polyisocyanates may be aromatic, aliphatic or cycloaliphatic or combinations of these types, depending upon the type resultant polyurethane desired.

Representative examples of such polyisocyanates may be, for example, the toluene diisocyanates (TDI), m-phenylene diisocyanate, 4-chloro-1,3-phenylene diisocyanate, 4,4'-tetramethylene diisocyanate (MDI), 1,6-hexamethylene diisocyanate, 1,10-decamethylene diisocyanate, 1,4-cyclohexylene diisocyanate, 4,4'-methylene-bis (cyclohexylisocyanate) and 1,5-tetrahydronaphthalene diisocyanate, and mixtures of such diisocyanates as may be desired or appropriate.

The MDI is understood to exist in three isomers, namely 2,2-MDI, 2,4-MDI and 4,4-MDI and is understood to be generally provided commercially as at least 98 percent 4,4-MDI with a small 2,4-MDI content which may sometimes be referred to as "pure MDI".

The TDI is generally commercially provided as a mixture of 2,4- and 2,6-isomers in a form of an 80:20 blend thereof, also in a form of a 63:35 blend or 95:5 blend of the two isomers.

The toluene-diisocyanates (TDI), diphenylmethane-4,4'-diisocyanate (MDI), 3,3'-dimethyl-4,4'-bis phenylene diisocyanate (TODI) and 4,4'-methylene bis(cyclohexyl isocyanate) ($H_{12}MDI$) are generally desired where appropriate, with the TDI and MDI being more generally desirable.

Various nonreactive solvents known to those skilled in the polyurethane art can be used for the preparation of the polyurethane reaction mixtures, if a solvent is desired and appropriate. Representative of the solvents are, for example, aromatic solvents such as benzene, xylene and toluene, and the liquid lower ketones such as acetone, methyl ethyl ketone, methyl isobutyl ketone, and diisobutyl ketone. If the polyurethane reaction mixtures are to be used to prepare the cured polyurethanes in confined areas which are subject to explosive hazards, nonflammable chlorinated solvents can be used to form nonflammable polyurethane reaction mixtures.

The practice of this invention is further illustrated by reference to the following examples which are intended to be representative rather than restrictive of the scope of the invention. Unless otherwise indicated, the parts and percentages are by weight of the polyurethane.

EXAMPLE

Polyurethane reaction mixtures are prepared to evaluate an inclusion of a dispersion of granular aggregates of pulverized compacted pellets of rubber reinforcing carbon black in a polyurethane reaction mixture comprised of polymeric polyester polyol and polyisocyanate. The carbon black aggregates were a product of pulverization of pellets of compacted rubber reinforcing carbon black by ball milling until the carbon black aggregates were reduced to a size in a range of from about 10 to about 12 microns.

The carbon black of the carbon black pellets was a rubber reinforcing carbon black as N110, an ASTM designation, with a reported Iodine absorption number of about 145 g/kg according to ASTM D1510, and a DBP (dibutylphthalate) adsorption value of about 113 cc/100 g according to ASTM D2414.

The carbon black pellets were heated to about 104° C. to initially remove residual water of absorption and then cooled under nitrogen. The ball milling of the carbon black pellets was conducted under a moisture-free, dry nitrogen atmosphere to form carbon black aggregates.

The polymeric polyester polyol was blended with the carbon black aggregates, molecular sieve desiccant as well as dioctyl adipate plasticizer to reduce viscosity to promote its processability and this mixture was degassed separately from the polyisocyanate under vacuum to remove any residual moisture. For convenience, a plasticizer (e.g. dioctyl adipate) could have been blended with the polymeric polyol to make it more fluid.

The polymeric polyester polyol containing the carbon black aggregates and molecular sieve desiccant was blended with the polyisocyanate to form a polyurethane reaction mixture which was cast into a toroidally shaped tire mold pre-heated to a temperature of about 82° C. and the polyisocyanate allowed to react with both the polymeric polyol and isocyanate reactive groups on the surface of the pulverized carbon black granules to form a molded (shaped) carbon black reinforced polyurethane tire. The polyurethane tire was allowed to further cure at a temperature of about 104° C.

For this evaluation, a Control Sample A was prepared comprised of reacting a liquid reaction mixture comprised of polymeric polyester polyol and polyisocyanate without carbon black, dioctyl adipate or molecular sieves to form a polyurethane product.

Experimental rubber Sample B was prepared with the polymeric polyol and polyisocyanate of Control rubber Sample A wherein granules of ball milled pellets of compacted rubber reinforcing carbon black were blended with the polymeric polyol together with desiccant of molecular sieves and plasticizer as the dioctyl adipate prior to adding the polyisocyanate to form the polyurethane.

For Experimental rubber Sample B, the rubber reinforcing carbon black was N231, an ASTM designation, reportedly characterized by an iodine value (ASTM D1510) of about 121 g/kg and a DBP (dibutylphthalate) value of about 92 cc/100 g.

Experimental rubber Sample C was prepared with the polymeric polyol and polyisocyanate of Control rubber Sample A wherein granules of ball milled pellets of compacted rubber reinforcing carbon black were blended with the polymeric polyol together with desiccant of molecular sieves and plasticizer as the dioctyl adipate prior to adding the polyisocyanate to form the polyurethane. For Experimental rubber Sample C, the rubber reinforcing carbon black was N120, an ASTM designation, reportedly characterized by an iodine value (ASTM D1510) of about 122 g/kg and a DBP (dibutylphthalate) value (ASTM D2414) of about 114 cc/100 g.

The components of the polyurethane reaction mixture are reported in the following Table 1 where the values are reported in terms of weight unless otherwise indicated.

TABLE 1

Polyurethane Reaction Mixture

| | Parts by Weight | | |
|---|---|---|---|
| Material | Control Sample A | Exp'l Sample B | Exp'l Sample C |
| Polymeric polyester polyol and polyisocyanate[1] | 100 | 100 | 100 |
| Carbon black granules (N231)[2] | 0 | 1.4 | 0 |
| Carbon black granules (N120)[3] | 0 | 0 | 2.1 |
| Molecular sieves[4] | 0.34 | 0.34 | 0.34 |
| Plasticizer, dioctyl adipate[5] | 0 | 6.2 | 4.8 |

[1]Polyurethane reaction mixture comprised of (a) 100 parts of polymeric polyester polyol as Elastocast ™ as a viscous liquid product of BASF, and (b) 46.5 parts of polyisocyanate as MDI as Lupranate MP102 ™ from BASF
[2]and [3]Carbon black granules from ball milled pellets of compacted rubber reinforcing carbon black as N231 and N120 (ASTM designations), respectively, having an average aggregate particle size in a range of about 10 to about 12 microns.
[4]Dried molecular sieves in a form of a white powder as a product of the Alfa Assar Company
[5]The dioctyl adipate plasticizer from Sigma Aldrich The reaction mixtures were allowed to react to form polyurethanes. Various physical properties of the polyurethanes are reported in the following Table 2.

TABLE 2

Polyurethane Properties

| | Control | Experimental | |
|---|---|---|---|
| Polyurethane Property | Sample A | Sample B | Sample C |
| Shore A hardness (23° C.) | 77 | 74 | 74 |
| Percent dispersion of granules in the polyurethane | n/a | 88 | 82 |
| Modulus (300%), MPa | 8 | 6.5 | 7 |
| Tensile strength, MPa | 8.8 | 28 | 32 |
| Elongation at break (percent) | 319 | 544 | 547 |
| Grosch abrasion rate (high severity test) (mg/km) | 539 | 697 | 498 |
| Ross flex test, number of cycles, (higher is better) | 17,000 | 71,000 | 54,000 |
| Tear strength, N/mm | 106 | 90 | 123 |

[1]The percent dispersion relates to the degree of dispersion of the carbon black granules in the polyurethane.
[2]The Grosch abrasion rate can be run on a LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons, 2° slip angle, disk speed of 40 km/hr for a distance of 7,500 meters; a medium abrasion severity test may be run, for example, at a load of 40 Newtons, 6° slip angle, disk speed of 20 km/hr and distance of 1,000 meters; a high abrasion severity test may be run, for example, at a load of 70 Newtons, 12° slip angle, disk speed of 20 km/hr and distance of 250 meters; and an ultra-high abrasion severity test may be run, for example, at a load of 70 Newtons, 16° slip angle, disk speed of 20 km/hr and distance of 500 meters.
[3]ASTM Test D1052 - The Ross Flex Test is a measure of 500 percent growth of an initial crack length in terms of cycles to achieve such growth, where a higher number of cycles is better.
[4]Data obtained according to a tear strength (peal adhesion), or tear resistance test as ASTM D624 Test From Table 2 it can be seen that the polyurethane was dynamically reinforced by the granules of pulverized compacted carbon black (including use of the molecular sieves for the polymeric polyol component of the polyurethane) as shown by the Ross flex values (number of cycles for 500 percent crack growth). In particular, the Ross flex values (cycles) for the polyurethane of Experimental Samples B and C containing the granular pulverized carbon black pellets were significantly and beneficially higher than the ross flex value for the Control polyurethane Sample A which did not contain the granular pulverized carbon black pellets.

From Table 2 it can also be seen that the tensile strength, elongation at break and tear resistance properties of the polyurethanes of Samples B and C with the inclusion of the addition of the granular pulverized pellets of compacted rubber reinforcing carbon black.

It can additionally be seen from Table 2 that the polyurethane of Sample B containing the granules of pulverized pellets of compacted rubber reinforcing carbon black N231 presented increased tensile strength and elongation values as compared to polyurethane Sample C containing the granules of pulverized pellets of compacted rubber reinforcing carbon black N120.

From Table 2 it can further be seen that the Shore A hardness values remained in a range of from about 74 to about 77. This consistency is considered to be beneficial in a sense that the Shore A hardness of the polyurethane is understood to be determinative of the vertical spring rate of a tire composed of the polyurethane and thereby a handling component of the tire. In other words, the inclusion of the small amount of granules of disintegrated carbon black pellets significantly beneficially affected the physical properties of the polyurethanes with little effect on their Shore A hardness values.

Therefore, it is concluded that the inclusion of the granular pulverized pellets of compacted rubber reinforcing carbon black in the polyurethane, together the use of molecular sieve desiccant for its preparation, enabled a successful preparation of a carbon black reinforced polyurethane as being useful for dynamic polyurethane application as indicated by the Ross flex values.

While in accordance with the patent statutes the best mode and preferred embodiment has been set forth, the scope of the invention is not limited thereto, but rather by the scope of the attached claims.

What is claimed is:

1. A toroidal tire is provided containing at least one component comprised of a carbon black reinforced polyurethane containing a dispersion consisting of molecular sieve desiccant and from about 1 to about 5 weight percent of granules of pulverized pellets of compacted rubber reinforcing carbon black where said granules have an average aggregate particle size in a range of from about 1 to about 15 microns, wherein the polyurethane is the product of a reaction mixture of at least one polymeric polyol and organic polyisocyanate having a ratio of isocyanate groups to hydroxyl groups of said polymeric polyol in a range of from about 1.1/1 to about 2/1, wherein said polymeric polyol is comprised of at least one of polyester polyol and polyether polyol, wherein the carbon black reinforcement of said polyurethane is the product of said polyisocyanate and isocyanate reactive groups on said pulverized rubber reinforcing carbon black granules where said isocyanate reactive groups are comprised of at least one of hydroxyl groups, carboxylic acid groups, and quinone groups.

2. The tire of claim 1 wherein said component is selected from a circumferential tread, tire sidewalls and tire carcass.

3. The tire of claim 1 wherein said component is a tire carcass wherein the tire tread is a diene-based rubber composition.

4. The tire of claim 1 wherein said rubber reinforcing carbon black for said compacted carbon black pellets is characterized by having an iodine adsorption value (ASTM D1510) in a range of from about 100 to about 145 g/kg together with a dibutylphthalate (DBP) value (ASTM D2414) in a range of from about 40 to about 125 cc/100 g.

5. The tire of claim 1 wherein the polymeric polyol is a saturated hydrocarbon polymeric polyol having a hydroxyl functionality of from about 2 to about 3.

6. The tire of claim 1 wherein the polymeric polyol is a polymeric polyester polyol.

7. The tire of claim 1 wherein the polymeric polyol is a polymeric polyester polyol as a product of dicarboxylic acid having from about 4 to about 10 carbon atoms and hydroxyl terminated hydrocarbon diol having from 2 to 8 carbon atoms.

8. The tire of claim 7 wherein the polyester polyol is a condensation product of glycols and organic polycarboxylic acid or anhydride of polycarboxylic acid.

9. The tire of claim 8 wherein said glycols are comprised of at least one of ethylene glycol, propylene glycol, butylene glycol, pentylene glycol and decamethylene glycol.

10. The tire of claim 9 wherein said organic dicarboxylic acids are comprised of at least one of succinic acid, glutaric acid, adipic acid, phthalic acid, terephthalic acid, isophthalic acid, suberic acid, sebacic acid, pimelic acid, and azelaic acid.

11. The tire of claim 9 wherein said anhydrides are comprised of from about one to 20 percent by weight of organic polycarboxylic acid and at least one of a hydrocarbon triol or higher polyfunctional polyol can be present to promote branching in the polyurethane polymer.

12. The tire of claim 1 wherein the polymeric polyol is a polyether polyol.

13. The tire of claim 12 wherein the polyether polyol is a product of at least one of alkylene oxides and alkylene glycols.

14. The tire of claim 1 said polymeric polyols have a molecular weight in a range of form about 1,200 to about 1,400 Daltons.

15. The tire of claim 1 wherein said organic polyisocyanate is comprised of at least one of aromatic, aliphatic and cycloaliphatic polyisocyanate.

16. The tire of claim 1 wherein the ratio of isocyanate groups of said polyisocyanate to hydroxyl groups of said polymeric polyol is in a range of from about 0.8/1 to about 2/1.

17. The tire of claim 1 wherein polyurethane contains the dispersion of granules of pulverized pellets of compacted rubber reinforcing carbon black in an amount of from about 1 to about 54 weight percent.

18. The tire of claim 1 wherein the carbon black granules of pulverized compacted carbon black pellets have an average aggregate particle size in a range of from about 5 to about 10 microns.

* * * * *